UNITED STATES PATENT OFFICE.

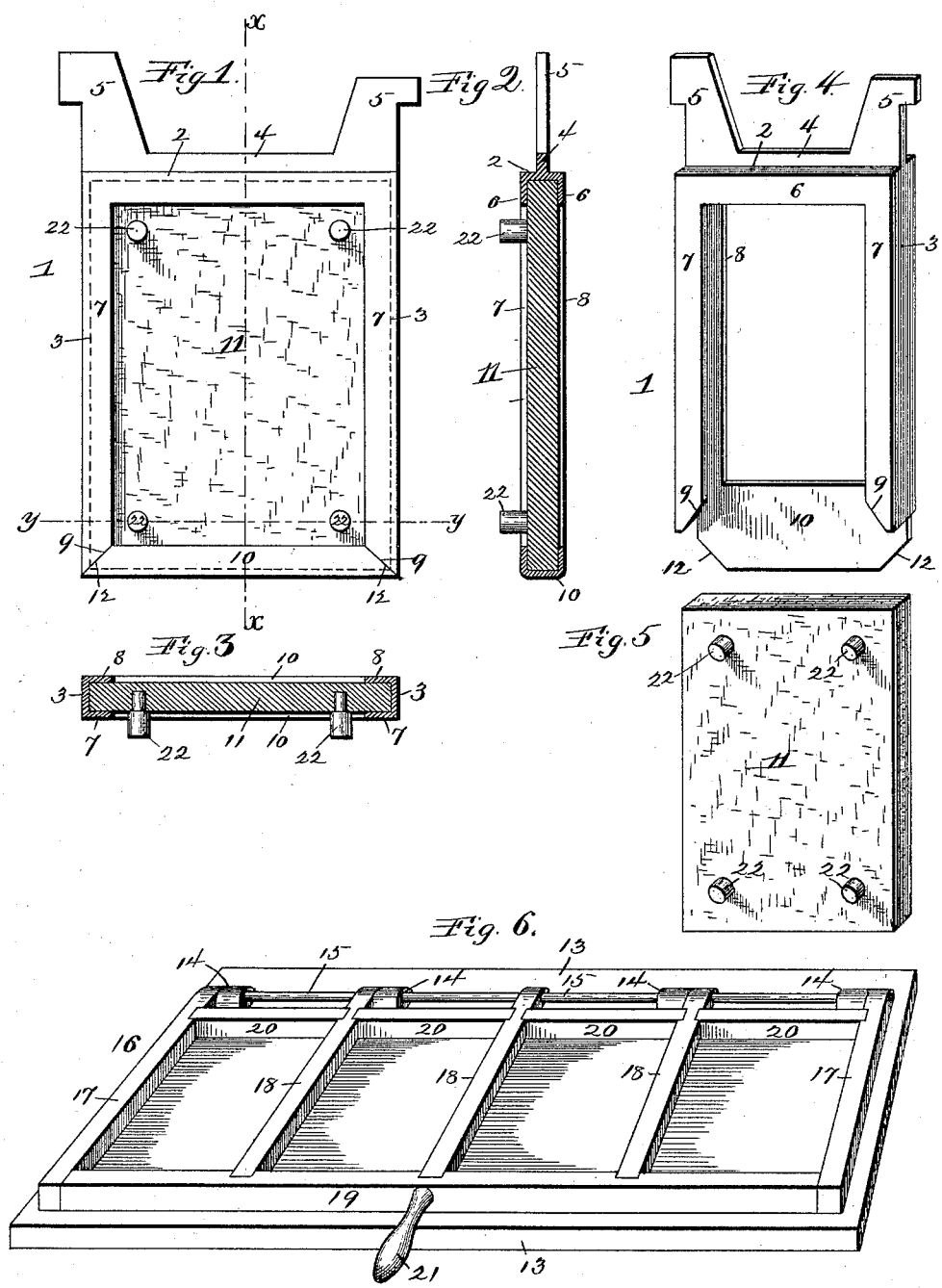

JAMES F. McLAUGHLIN, OF PHILADELPHIA, PENNSYLVANIA.

ELECTRODE FOR SECONDARY BATTERIES.

SPECIFICATION forming part of Letters Patent No. 432,202, dated July 15, 1890.

Application filed December 19, 1889. Serial No. 334,262. (No model.)

*To all whom it may concern:*

Be it known that I, JAMES F. McLAUGHLIN, a citizen of the United States, and a resident of Philadelphia, in the county of Philadelphia and State of Pennsylvania, have invented certain new and useful Improvements in Secondary-Battery Electrodes, of which the following is a specification.

This invention relates to improvements in electrodes for secondary batteries, its object being to produce a secondary-battery electrode wherein a great amount of active material is safely lodged in such manner that it will not be detached by the vibrations to which the secondary battery is subjected when used for the propulsion of vehicles.

My improvement is illustrated in the accompanying drawings, in which—

Figure 1 is an elevation of the face of the electrode. Fig. 2 is a vertical section of the same on the line x x of Fig. 1. Fig. 3 is a transverse section on the line y y of Fig. 1. Fig. 4 is a perspective view of the frame or holder for the active material prepared to receive the same. Fig. 5 is a perspective view of a block or prism of active material in position for insertion in the frame or holder shown in Fig. 4, and Fig. 6 is a perspective view of a molding-frame for casting the blocks or prisms of active material.

Like numerals of reference indicate like parts throughout the drawings.

Referring to the drawings, and more particularly to Figs. 1, 2, 3, and 4, there is shown a rectangular frame 1, preferably constructed of lead and consisting of a top piece 2 and two side pieces 3 3, preferably integral therewith, the frame being provided with a bottom piece in a manner hereinafter described.

Extending longitudinally along the center of the top piece 2 is a strengthening-rib 4, and rising from this rib at its ends are angle-pieces 5 5, which serve to support the electrode when placed in a containing-vessel. The top piece 2 has also formed on it at the edges two depending flanges 6 6, and the side pieces 3 have similar flanges 7 8, projecting inward from their edges, the flanges 7 having their lower ends mitered, as shown at 9, and the flanges 8 being joined at their lower ends by a flap 10.

It will now be seen that the flanged top and sides of the frame constitute guides or ways which will embrace the three sides of a rectangular object placed within the frame, and such object is shown in the drawings as a block or prism 11 of active material, formed in a manner hereinafter described. This block or prism 11 is placed within the frame through its open lower end, and when moved until its upper end is in contact with the top 2 of the frame it will be seen that it is embraced on three sides or edges by the flanged top and sides of the said frame.

In order to secure the block or prism 11 against displacement in the frame or holder 1, the flap 10, which joins the lower ends of the flanges 8 and extends below the same, is bent across the bottom of the frame with its edges engaging the lower edges of the side pieces 3, and then upward against the block or prism 11, the two opposite corners of the said flap being mitered, as shown at 12, in order to engage the mitered lower ends 9 of the flanges 7. The edges of the flap are then soldered to the side plates 3 and mitered ends of the flanges 7, formed thereon, and this flap 10, so bent and secured, constitutes a groove or seat for the lower end of the block or prism 11. These blocks or prisms 11 may be formed of any suitable active material—such as the oxide of lead, (red lead,) peroxide of lead, and the like; but I prefer an emulsion of red oxide of lead and plaster-of-paris in dilute sulphuric acid. This emulsion may be cast in suitable molds, and rapidly "sets" or hardens, forming an extremely durable block, in which the active material is bound together by the plaster-of-paris in such manner that it will not crack or flake off when subjected to the process of forming and charging and to the jars and vibrations of traveling vehicles, for the propulsion of which the secondary batteries made up of my electrodes are specially adapted. A casting-frame for forming these blocks or prisms is illustrated in Fig. 6; and it consists of a table 13, on which by means of eyes 14, secured to the said table and the pintle-rod 15, is hinged a rectangular frame 16. This frame consists of the end piece 17 and division-strips 18, parallel with the end pieces, a notched front piece or strip 19, in which one end of each division-strip is seated, and to the ends of which the end pieces are secured, and spacing-bars 20, seated in the division-strips and end pieces near their other ends, the said other ends being perforated for the passage of the pintle-rod 15. To the center of the front strip or piece 19 is secured a handle 21, by means of which the entire frame may be moved on its hinge. The strips 18 divide the frame into a number of compartments, each of which corresponds in size to a block or prism that will fit in the frame or holder 1. Into these compartments, the bottoms of which are formed by the table 13, is poured the emulsion before described until its surface is flush with the top of the frame, and it is then allowed to harden; but before it has completely set spacing-pins 22, of hard rubber or other non-conducting material, are pressed into the active material in each compartment near the corners thereof. These pins may be formed as shown in Fig. 3—that is, with a reduced portion entering the active material—or such portion may be dovetailed or otherwise formed so as to be fixed within the material, when hardened, against the possibility of accidental displacement, and they prevent the electrodes from coming in contact one with another when a number are placed in a single containing-vessel. It will now be seen that in an electrode constructed as above described the holder provided for the active material embraces the same entirely around its edges and sustains it in such manner that shocks or vibrations will in no wise harm it, while at the same time a large surface of the block of active material is presented to the action of the electrolyte.

Having now fully described my invention, what I claim as new, and desire to secure by Letters Patent, is—

1. An electrode for secondary batteries, consisting of a block of active material mounted in a rectangular supporting-frame, having guides formed in three sides and a flap on the fourth side, said flap being formed, as shown, to be bent around the lower edge of the active material, and thus close the supporting-frame, substantially as described.

2. An electrode for secondary batteries, composed of a block of active material and a rectangular supporting-frame, having guides formed in three sides and a flap on the fourth side, formed to be bent around the lower edge of the active material, in combination with spacing-pins of insulating material embedded in and projecting from the active material, substantially as described.

3. A support for the active material of secondary-battery electrodes, consisting of a rectangular frame having guides formed in three sides and a flap on the fourth side, said flap being formed, as shown, to be bent around the lower edge of the active material and thus close the supporting-frame, substantially as described.

In testimony whereof I have signed my name to this specification in the presence of two subscribing witnesses.

JAMES F. McLAUGHLIN.

Witnesses:
EDWIN F. GLENN,
WM. W. KER.